Dec. 17, 1963  A. E. WILDE  3,114,420
APPARATUS AND METHOD FOR SUB-SEA DRILLING
Filed May 8, 1958  2 Sheets-Sheet 1
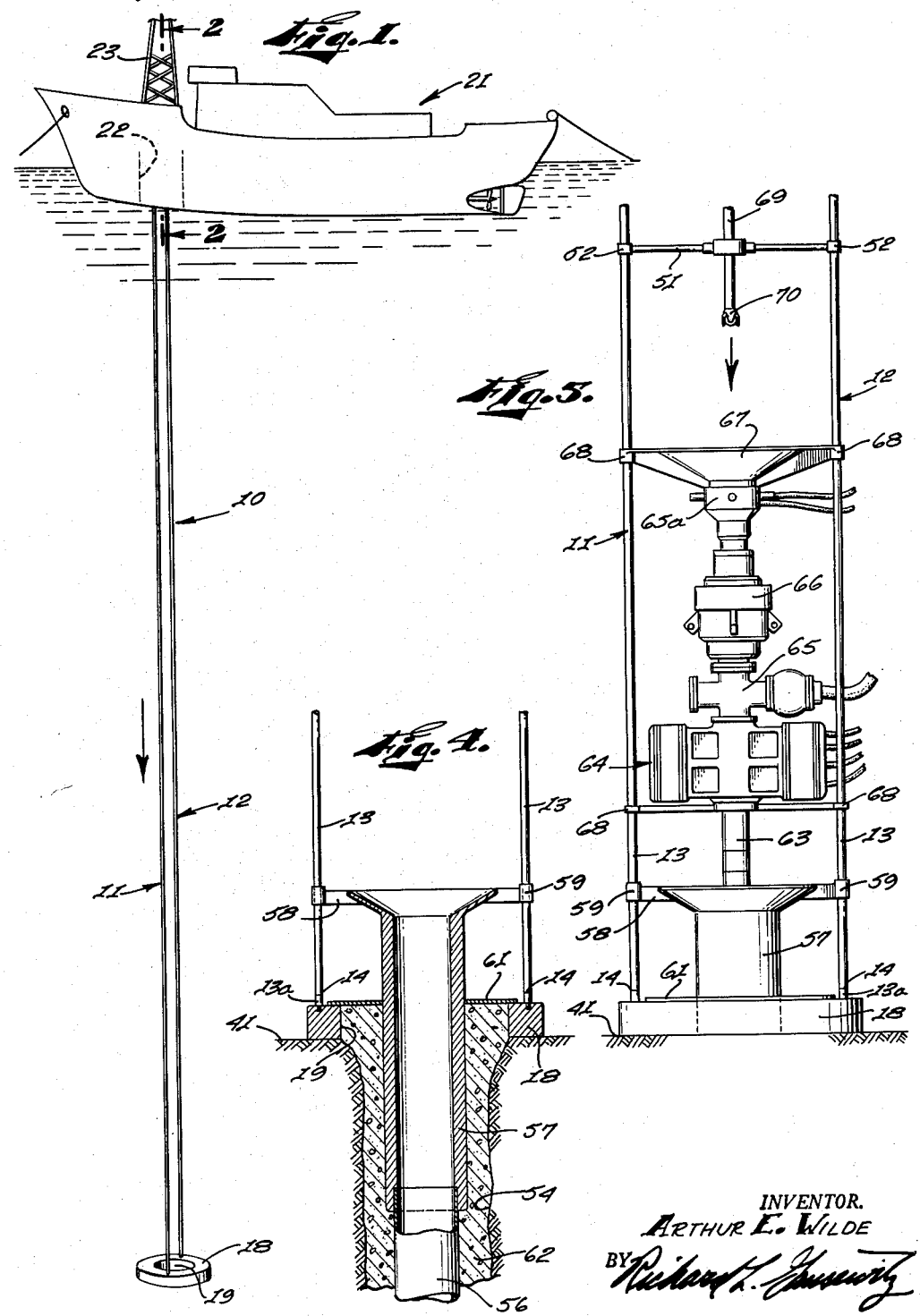
INVENTOR.
ARTHUR E. WILDE
BY
ATTORNEY Dec. 17, 1963
A. E. WILDE
3,114,420
APPARATUS AND METHOD FOR SUB-SEA DRILLING
Filed May 8, 1958
2 Sheets-Sheet 2
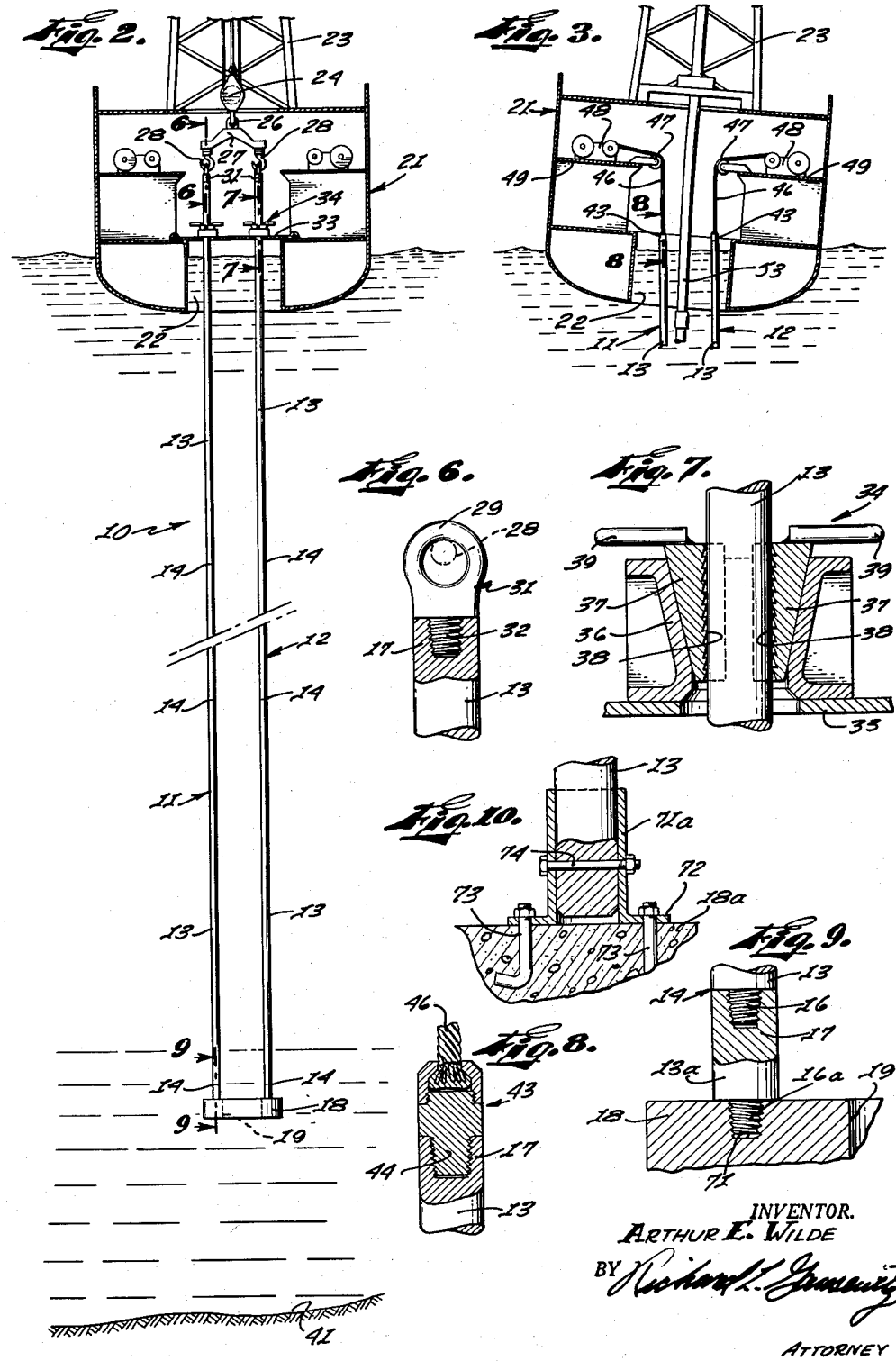
INVENTOR.
ARTHUR E. WILDE
BY
ATTORNEY

United States Patent Office 3,114,420
Patented Dec. 17, 1963

3,114,420
APPARATUS AND METHOD FOR SUB-SEA DRILLING
Arthur E. Wilde, Santa Ana, Calif., assignor to Shaffer Tool Works, Brea, Calif., a corporation of California
Filed May 8, 1958, Ser. No. 734,049
5 Claims. (Cl. 166—46)

This invention relates to an apparatus and method for sub-sea drilling, and more particularly to means and methods for guiding tools between a floating vessel and a wellhead at the floor or bottom of a body of water.

When a floating vessel is employed to drill wells in the floor of an ocean or other body of water, it is necessary to establish guiding mechanism or means to orient all equipment travelling between the vessel and the wellhead. The guiding mechanism previously employed comprised a pair of flexible steel cables connected between the ship or vessel and the wellhead, but such cables were characterized by at least two serious defects. In the first place, the flexible cables did not extend directly between the ship and the wellhead, but instead drifted far out of line because of the effects of currents. The equipment being guided therefore followed a long, curved path before reaching the wellhead, which gave rise to a number of problems particularly where the equipment being guided was relatively rigidly associated with the vessel such as by being connected through strings of pipe.

The second of the above-mentioned serious defects of steel cables related to the rapid corrosion and deterioration thereof. Because of the large number of small strands in each cable, a very great surface area was exposed to the salt water. It will be understood that because each small strand was simultaneously corroded from all sides, the entire cable became greatly weakened by corrosion in a relatively short period of time.

In view of the above factors characteristic of methods and apparatus for guiding equipment between a floating vessel and a wellhead on the floor of a body of water, it is an object of the present invention to provide a method and apparatus for guiding equipment to the wellhead in a relatively straight and direct line from the vessel, thereby causing equipment to follow a short and straight path instead of a long, circuitous one.

A further object is to provide improved undersea guide apparatus for oil well drilling equipment, such apparatus being capable of withstanding the effects of salt water for long periods of time without substantial corrosion or weakening.

A further object is to provide a method and apparatus for forming relatively rigid guides between a floating vessel and the ocean floor, and recovering the guides after completion of drilling, in a rapid and effective manner.

These and other objects and advantages of the invention will be more fully set forth in the following specification and claims, considered in connection with the attached drawings to which they relate.

In the drawings:

FIGURE 1 is a schematic side elevation illustrating the guide mechanism of the invention as suspended from a vessel or ship;

FIGURE 2 is a schematic view showing the ship in transverse section on line 2—2 of FIGURE 1, and showing the guide mechanism in elevation;

FIGURE 3 is a schematic view corresponding generally to the upper portion of FIGURE 2, but showing the arrangement of the parts after the guide mechanism has been disconnected from the lowering means and connected to tension cable and winch means;

FIGURE 4 is a fragmentary view, primarily in vertical section, showing the condition of the wellhead after lowering of the surface string of casing, and setting of the cement;

FIGURE 5 is an elevational view of the wellhead, and showing certain drilling equipment in condition to receive a drill bit on the lower end of a drill string;

FIGURE 6 is a fragmentary view from line 6—6 of FIGURE 2, showing a lifting sub associated with a swivel at one end of the yoke;

FIGURE 7 is a fragmentary sectional view taken on line 7—7 of FIGURE 2, illustrating one of the slip mechanisms;

FIGURE 8 is a fragmentary section taken on line 8—8 of FIGURE 3, showing the tension sub at the lower end of one of the tension cables;

FIGURE 9 is a fragmentary section on line 9—9 of FIGURE 2 and illustrating the releasable connection between the lowermost rod and the weight means; and FIGURE 10 is a fragmentary sectional view corresponding generally to FIGURE 9 but illustrating a second form of connection between the lowermost rod and a weight means.

Stated generally, the invention involves the concept of employing guide means formed of rigid members which are connected by means of rigid joints, in combination with means for applying predetermined tension to the upper ends of the strings of rigid members. The rigid members are solid instead of being formed of a large number of strands, and thus are relatively immune to the corrosive effects of the water.

Stated more particularly, and with reference to the drawings, the guide means is indicated generally at 10 and comprises two parallel strings 11 and 12 of rigid rod sections 13 (FIGURE 2). The sections 13 in each string 11 and 12 are rigidly connected to each other by means of joints 14 at the ends thereof. The joints are of a type which do not permit substantial rotation of one rod section 13, relative to the next one, about any axis excepting the common longitudinal axis of the connected sections.

The illustrated rod sections 13 are elongated cylinders, and are preferably formed of steel. The illustrated joints 14 each comprise a downwardly-extending externally threaded pin 16 (FIGURE 9) provided at the lower end of each rod section 13, and threaded into a corresponding, internally-threaded box 17 at the upper end of each rod section. Each joint 14 is of the flush type, by which it is meant that the exterior diameter of the rod sections adjacent pins 16 is the same as the diameter at the boxes 17. Each rod section preferably has a uniform diameter throughout, and the various rod sections are preferably substantially identical to each other.

The guide mechanism additionally comprises a weight and connector means 18 provided at the lower ends of the strings 12 and 13. Weight means 18, which preferably comprises a heavy concrete or iron ring having an opening 19 in its center, serves the function of maintaining the strings in downwardly-pointing, parallel relationship as they are lowered into the ocean or other body of water. The lower ends of the strings are rigidly connected to diametrically opposite portions of the upper surface of ring 18 by releasable joints to be described hereinafter. As illustrated, the weight and connector ring 18 should be disposed in a plane perpendicular to the rod strings 11 and 12, namely in a horizontal plane as distinguished from a vertical one.

Proceeding next to a description of the method and apparatus for lowering the rod strings 11 and 12, and the weight ring 18, into the ocean, this comprises a suitable barge or vessel 21 which preferably has a well 22 formed therein. As shown schematically in FIGURES 2 and 3, a derrick 23 is anchored on the deck of the barge above well 22 and is adapted to suspend a travelling block 24 having a hook and swivel 26 thereon. Suspended on the hook and swivel 26 is a yoke 27 the ends of which are provided with swivelled hooks 28.

As illustrated in FIGURE 6, the swivelled hook 28 at each end of the yoke 27 extends through an eye portion 29 of a lifting sub 31 having a downwardly extending threaded pin 32. The pin 32 is adapted to be threadedly connected into any one of the internally-threaded boxes 17 at the upper ends of the various rod sections 13 in each string.

During lowering of the guide means 10 into the water, a cover or support 33 (FIGURE 2) is provided over well 22 in barge 21 and is adapted to support slip apparatus 34 which is best illustrated in FIGURE 7. The slip apparatus for each string 11 and 12 comprises a tapered bowl 36, having a downwardly-convergent frusto-conical inner surface, and adapted to receive a plurality of tapered slip elements 37 having teeth 38 on their inner surfaces. The teeth 38 are so shaped that the weight of the string tends to wedge the slips 37 into the bowl 36, thereby effectively gripping the rod section 13 around which the slips are disposed. However, as soon as the rod section 13 is lifted by the travelling block and yoke 27, the slips are loosened and may be removed by merely lifting upon the handles 39. The tapered bowls 36 are preferably so constructed that they may be mounted around the rods 13, in addition to being mounted over the rod ends.

As the first step in lowering the weight means 18 and strings 11 and 12 into the water, the weight means 18 may be supported upon the cover 33 for the well 22. The lowermost sections 13 of rod are then connected at their lower ends to the weight means 18, and are threadedly connected to the lifting subs 31 (FIGURE 6) at their upper ends. The travelling block 24 is then raised to lift the weight means 18 off the support 33, after which the support 33 is removed from over the well 22. Travelling block 24 is then lowered until the weight means 18 is in the water and the lifting subs 31 are spaced a short distance above the upper portion of the well.

The support or cover 33 is then again mounted in position, around the rod sections 13, and the tapered bowls 36 of the slip mechanisms 34 are mounted around the respective rods. Slips 37 are then inserted into the respective bowls 36, and the travelling block 34 is lowered until the weight of the weight means 18 is borne by the slips instead of by the yoke 27, travelling block 24, etc. In order to make possible the above-indicated re-mounting of support or cover 33 in position around the rod sections 13, such cover may be of sectional construction and provided with suitable fastener means to secure the cover sections together around the rod sections 13. Alternatively, the cover may be formed in the general manner of a clevis, or may be provided with suitable slots extending radially from the openings for the sections 13 and sufficiently wide to permit passage therethrough of sections 13 upon mounting or demounting of the cover.

The threaded joints at lifting subs 31 are then disconnected, by use of suitable pipe wrenches, and the travelling block 24 is raised to a height sufficient to permit insertion of additional lengths 13 of rods above the lowermost lengths thereof. The additional lengths are then jointed to the lowermost lengths, by use of pipe wrenches making the joints 14 previously described, and joints are again made at the lifting subs 31. Travelling block 24 is then raised until strings 11 and 12 are lifted slightly, thereby effecting release of the slip mechanisms 34. The slips 37 are then again removed from the bowls 36 therefor, and travelling block 24 is lowered until the lifting subs 31 are relatively adjacent the slip mechanisms. Slips 37 are then re-inserted, and the process is repeated for the number of rod sections 13 which are required to effect lowering of the weight housing 18 to the ocean floor, which is indicated at 41.

The described method of lowering the weight means 18 and the strings 11 and 12 to the ocean floor 41 is relatively rapid. Because of the rigid nature of the strings 11 and 12, currents in the ocean or other body of water have relatively little effect in bending or bowing the same. The result is that the guide paths are substantially directly downwardly from the barge 21. Furthermore, the guide means 10 is advantageous in that the strings 11 and 12 are formed of solid sections instead of stranded cables, which sections are capable of withstanding the effects of salt water for a relatively long time, as previously stated.

As soon as the weight and guide means 18 has settled upon the ocean floor 41, the uppermost rod sections 13 are disconnected from the lifting subs 31 and connected to tension subs 43 best shown in FIGURES 3 and 8. The tension subs are also formed with downwardly-extending pins 44 adapted to be threaded into the boxes 17 at the upper ends of the rod sections. Tension subs are connected to flexible cables 46 which extend around pulleys 47 (FIGURE 3) and thence around constant-torque winch devices 48. It is pointed out that pulleys 47 may be of a suitable removable or retractable construction, thus are shown only in FIGURE 3 and not in FIGURE 2. The winches 48, which are located on floors 49 substantially above the well 22 and preferably on opposite sides thereof, may be of standard construction adapted to maintain the cables 46 under constant tension despite rocking movement of the barge due to the waves, or raising and lowering thereof due to tidal action. The strings of rods are then maintained substantially parallel, and relatively rigid, despite substantial movement of the vessel 21 in various ways.

The strings 11 and 12 are maintained under tension from the winches 48 during the entire drilling operation, and until lifting of the guide means out of the water as will be described hereinafter.

As an example of a drilling operation performed with the guide apparatus 10, a drilling string is first lowered down the guide strings 11 and 12, being guided by cross bar means of the general type indicated at 51 in FIGURE 5. The cross bar means is slidably associated with the drill pipe above the bit, and is also slidably associated with the guide strings 11 and 12 by means of eyes 52 at its opposite ends. The eyes 52 are sufficiently loose to slide readily over the guide strings, being unimpeded by the joints 14 since the latter are of a flush nature as previously stated. It is to be understood that the drill string and bit employed in this initial operation are much larger than the ones shown in FIGURE 5. Instead, the drill string, which is indicated at 53 in FIGURE 3, has a relatively large diameter.

It is pointed out that the cross bar means 51 has a central portion adapted to slidably receive the drill string 69 but insufficiently large to receive the drill bit 70. Such central portion is of a suitable split or clevis type in order to permit mounting thereof around the drill string despite the fact that drill bit 70 may not pass therethrough. With the described construction, raising of the drill string causes the bit 70 to pick up the cross bar means 51.

After the large-diameter drill bit and drill string 53 has been lowered down the guide strings 11 and 12, the drill bit enters the opening 19 in weight and guide means 18. A bore or hole 54 (FIGURE 4) is then made in the floor of the ocean. This drilling operation, including the lowering of the drill string, is according to conventional practice except for the use of the cross bar means 51 associated with the rigid guide strings. When the bore 54 has been drilled to a desired depth, with the drill pipe feeding through the central portion of cross bar means 51 due to the presence of a slidable connection therebetween, the entire drill string is removed from the bore 54 and is lifted out of the water by reversal of the above-mentioned procedure.

A conductor string 56 (FIGURE 4) of casing is then lowered into the hole 54. This is accomplished by first connecting the upper end of the conductor string 56, which is relatively short, to a tapered guide or tube 57 at the surface, that is to say in the vessel 21, and then lowering the entire assembly on a cross bar 58 associated with the upper, frustoconical end of the tapered guide 57. Cross bar 58 is provided at its ends with suitable eyes 59, corresponding to eyes 52, and may be lowered by use of suitable cable or other means, not shown. Fixedly provided on the body of the tapered guide 57 is a cover plate 61 which is adapted to seat upon the upper surface of weight means 18 as illustrated in FIGURE 4. The plate 61 may be apertured to facilitate outflow of water from the hole during cementing.

As soon as the cover plate 61 has seated upon the weight means 18, a suitable cementing means is lowered down the guide strings 11 and 12, according to conventional practice except for the use of a cross bar such as is indicated at 51, and cement is introduced around the conductor string 56 from a point at the lower end thereof. The cement, which is shown at 62, fills the entire space inside of the hole 54 and outwardly of the conductor string 56 and tapered guide 57. It is pointed out that the cover plate 61 aids in providing a unitary cemented assembly comprising the conductor string 56, guide 57, weight means 18 and cover plate 61. Such assembly is extremely heavy and rigid, so that the tension (provided by winches 48) upon the guide strings 11 and 12 may be increased after the cement has set.

Various drilling apparatus may next be lowered down the guide strings 11 and 12 and associated with the tapered guide 57. Referring to FIGURE 5, a typical assembly comprises a tube section 63, a hydraulically-operated pressure-control gate 64, a mud cross 65 for fill-up lines, a blowout preventer 66, a second mud cross 65a, and a submarine drilling head 67 shaped as a tapered guide. This entire assembly is made at the surface, in the barge 21, and is lowered down the guide strings 11 and 12 by means of suitable cross bars and eyes 68. The tube section 63 of the lower portion of the above-described assembly is suitably sealed inside of the first-mentioned tapered guide 57 by remotely controlled sealing or packer means, not shown.

A smaller-diameter drilling string 69 having a drill bit 70 at the lower end thereof, FIGURE 5, is then lowered down the guide strings 11 and 12 by means of the cross bar means 51. The bit 70 is sufficiently small that it will pass through the above-described assembly and into the conductor string 56. Drilling is thus performed through the conductor string 56 until a desired depth is achieved. More casing is set inside of and below the conductor string.

Upon completion of drilling, the drilling string 69 is lifted out of the well and out of the water in accordance with conventional methods, and the assembly comprising elements 63–68, inclusive, is retrieved. Thereafter, the connections between guide strings 11 and 12 and weight means 18 are broken, so that the guide strings 11 and 12 may be retrieved by a reversal of the lowering method described heretofore. The apparatus may then be employed to drill a different well, since only the tapered guide 57, surface string 56, weight housing 18 and cover plate 61, together with cross bar 58, remain at the ocean floor.

FIGURE 9 illustrates a first joint means by which the lowermost rod sections 13 may be disconnected from the weight means 18 without disconnecting any of the joints 14. Each such joint means comprises a short length 13a of rod having the box 17 at its upper end and a pin 16a at its lower end. Pin 16a corresponds to the pins 16 except that it is reverse-threaded into a corresponding opening 71 in the upper portion of weight means 18.

There is no torque on either guide string 11 or 12 during the lowering thereof into the water, because all of the joints are made above the slip apparatus 34 by means of several pipe wrenches. It follows that there will be no torque tending to disconnect the pins 16a from the weight means 18. However, when it is desired to effect such disconnection, it is merely necessary to apply a torque at the upper end of each string 11 and 12 and in a direction which is the same as that required to make the joints 14. This will tend to effect tightening of the various joints 14 but, because of the reverse threading of pin 16a, it will effect disconnection of pin 16a from weight means 18.

Referring next to FIGURE 10, the lowermost rod 13 in each string 11 and 12 is shown as inserted into a socket or ferrule 71a having a lower flange 72 through which J-bolts 73 are inserted. The hooked portions of the J-bolts are anchored in the weight means 18a which, in this illustration, is formed of concrete. A shear pin 74 is extended through rod 13 and through the walls of socket 71a. Pin 74 is sufficiently weak that it will shear when sufficient force is applied from the barge 21, it being remembered that the weight means 18a is securely anchored due to the cementing action described with relation to FIGURE 4. It is thus possible to separate the strings 13 and 14 from the weight means 18a without applying torque thereto.

Various embodiments of the present invention, in addition to what has been illustrated and described in detail, may be employed without departing from the scope of the accompanying claims.

I claim:

1. Apparatus for drilling a well in the floor of a body of water in which well drilling equipment is used, which apparatus comprises a vessel floating on the surface of said body of water, first and second rod strings extending between said vessel and the floor of said body of water, slip apparatus mounted on said vessel to suspend said strings therefrom in parallel and substantially coextensive relationship, a relatively heavy member adapted to serve as an anchor means, means to connect said member to said strings, said means being disconnectable from said member due to operations effected at the upper ends of said strings, means connected to the upper ends of said strings to apply substantially constant upward tension thereto after disconnection of said slip apparatus therefrom, and means to guide the drilling equipment along said strings between said vessel and said member.

2. The invention as claimed in claim 1, in which said rod strings each comprise a substantial number of elongated, relatively rigid and solid metal rods, and flush-type threaded joints to connect said rods together in a rigid manner.

3. A method of effecting sub-sea drilling from a floating vessel, which comprises providing a weight means, jointing the lower ends of two parallel sections of relatively rigid rod to said weight means by means of first joints, jointing the upper ends of said rod sections to a traveling block on said vessel and by means of second joints, lowering said traveling block to effect lowering of said rod sections and weight means into the water, providing slip means on said vessel around said rod sections to suspend said rod sections and weight means independently of said traveling block, disconnecting said second joints between the upper ends of said rod sections and said traveling block, connecting two additional rod sections between said first-mentioned rod sections and said traveling block, releasing said slip means, lowering said traveling block to lower said additional rod sections into the water, repeating said operations until said weight means is disposed on the floor of the body of water beneath said vessel, disconnecting said traveling block from the last-connected rod sections, connecting constant-tension cable means to said last-connected rod sections, thereafter passing a drill along said rod sections to said weight means by employing said rod sections as guides, drilling a bore adjacent said weight means, said bore being drilled through the surface portion of the floor of said body of water and in the absence of a previously-drilled bore, passing drilling equipment back and forth between said vessel and said weight means by employing said rods as guides, and finally disconnecting said first joints at the lowermost rod sections from said weight means and retrieving said rod sections so that said rod sections may be employed during drilling of a well at a different location.

4. Apparatus for effecting drilling in the floor of a body of water, which comprises a vessel floating on said body of water, said vessel having a well communicating with said body of water, a support movably supported on said vessel over said well and adapted to effect temporary support of objects over said well, first and second rod strings extending through said well to the floor of said body of water, elevator means mounted on said vessel to raise and lower said rod strings in parallel, slip apparatus mounted on said support over said well to suspend said rod strings when the same are disconnected from said elevator means, a relatively heavy member adapted to serve as an anchor means, means to secure the lower ends of said rod strings to said member, means to apply substantially constant upward tension to the upper ends of said rod strings after said member has been lowered to said floor of said body of water, and means to guide drilling equipment along said strings between said vessel and said floor.

5. The invention as claimed in claim 4, in which said well is sufficiently large to permit passage of said relatively heavy member therethrough, and in which said support over said well is adapted to be removed to permit such passage.

References Cited in the file of this patent

UNITED STATES PATENTS

| | | |
|---|---|---|
| 1,175,725 | Dunbar | Mar. 14, 1916 |
| 1,469,574 | Allan | Oct. 2, 1923 |
| 1,691,715 | Hansen | Nov. 13, 1928 |
| 1,768,295 | Rogers | June 24, 1930 |
| 2,421,377 | Gross | June 3, 1947 |
| 2,777,669 | Willis et al. | Jan. 15, 1957 |
| 2,808,229 | Bauer et al. | Oct. 1, 1957 |
| 2,923,531 | Bauer et al. | Feb. 2, 1960 |